(12) United States Patent
Roth et al.

(10) Patent No.: US 7,018,437 B2
(45) Date of Patent: Mar. 28, 2006

(54) SEPARATOR

(75) Inventors: Paul Roth, Isny i. Allgau (DE); Anton Kreis, Tettnang (DE); Helmut Grassinger, Argenbuhl-Eglofs (DE)

(73) Assignee: PROAIR GmbH Gerätebau, Argenbühl-Eglofs (DE)

( * ) Notice: Subject to any disclaimer, the term of this patent is extended or adjusted under 35 U.S.C. 154(b) by 176 days.

(21) Appl. No.: 10/707,062

(22) Filed: Nov. 19, 2003

(65) Prior Publication Data

US 2004/0098958 A1 May 27, 2004

(30) Foreign Application Priority Data

Nov. 19, 2002 (DE) .............................. 102 53 732

(51) Int. Cl.
*B01D 45/12* (2006.01)
(52) U.S. Cl. .............................. 55/406; 55/408; 55/455
(58) Field of Classification Search .................. 55/400, 55/406, 408, 409, 455; 415/208.2, 209.3
See application file for complete search history.

(56) References Cited

U.S. PATENT DOCUMENTS 2,368,961 A * 2/1945 Arnold ........................ 241/61
4,840,645 A * 6/1989 Woodworth et al. .......... 95/270

* cited by examiner

*Primary Examiner*—Robert A. Hopkins
(74) *Attorney, Agent, or Firm*—Gudrun E. Huckett

(57) ABSTRACT

A separator for a wet vacuum cleaner has a bottom and a sidewall connected to the bottom. The sidewall has lamellas delimiting slots, wherein through the slots an air/gas flow enters an interior of the separator, delimited by the bottom and the sidewall, wherein the air/gas flow contains dirt/dust particles and/or water droplets. The lamellas each have at least one radial outer widened section, extending in a rotational direction of the separator, and at least one remaining lamella section, wherein the at least one radial outer widened section and the at least one remaining lamella section delimit together a turbulence chamber, respectively.

30 Claims, 7 Drawing Sheets

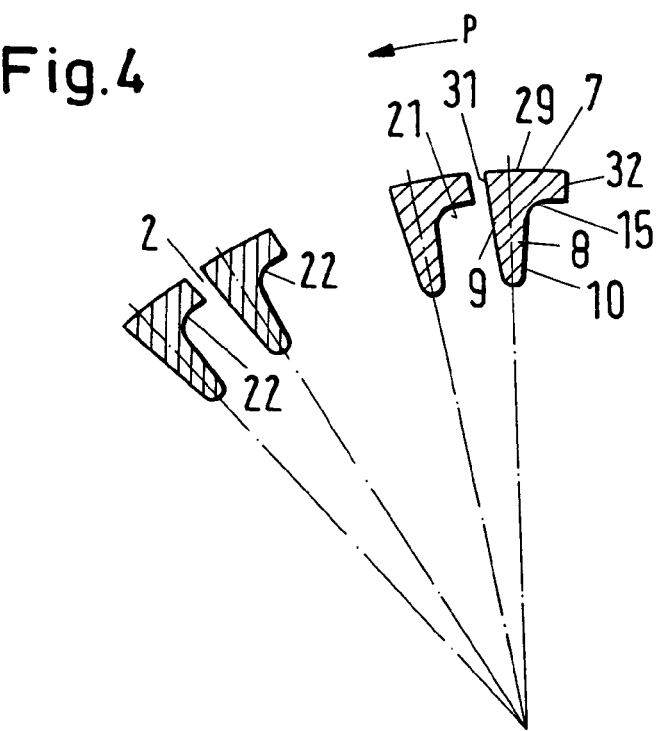
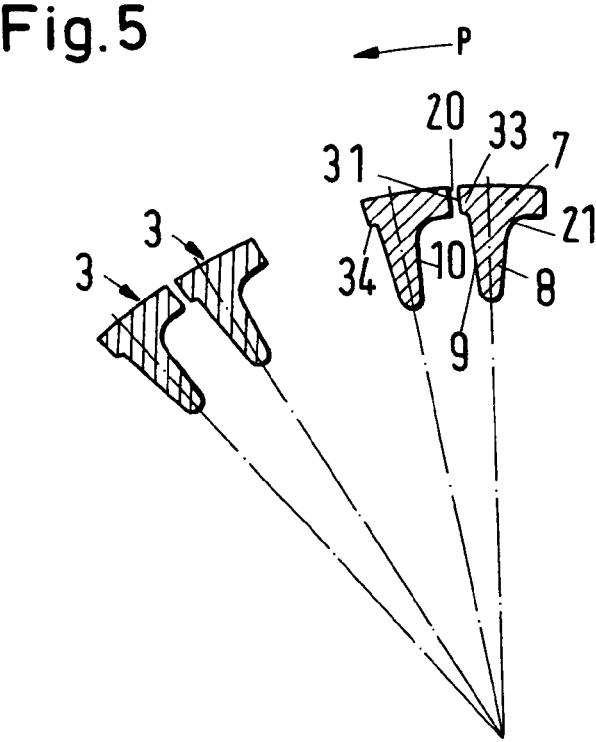

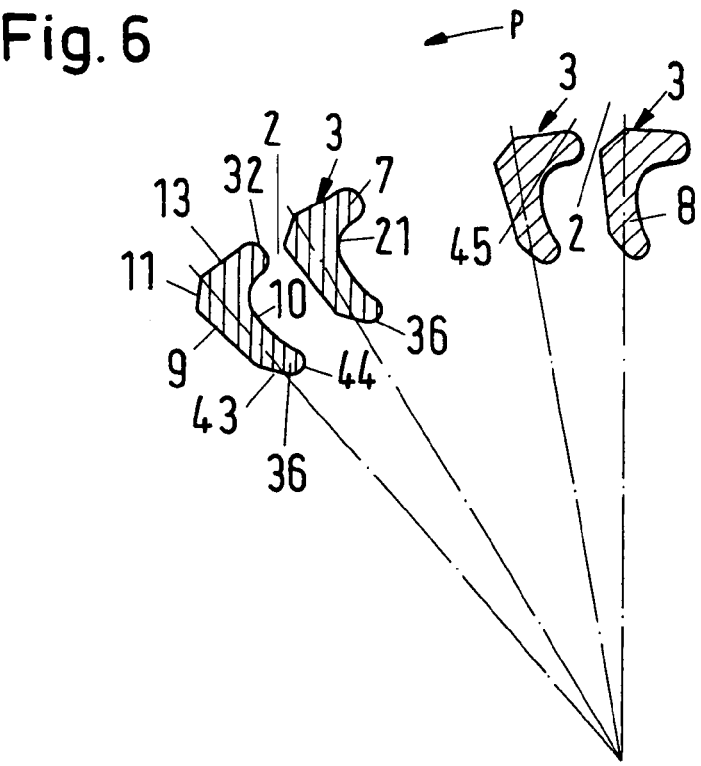
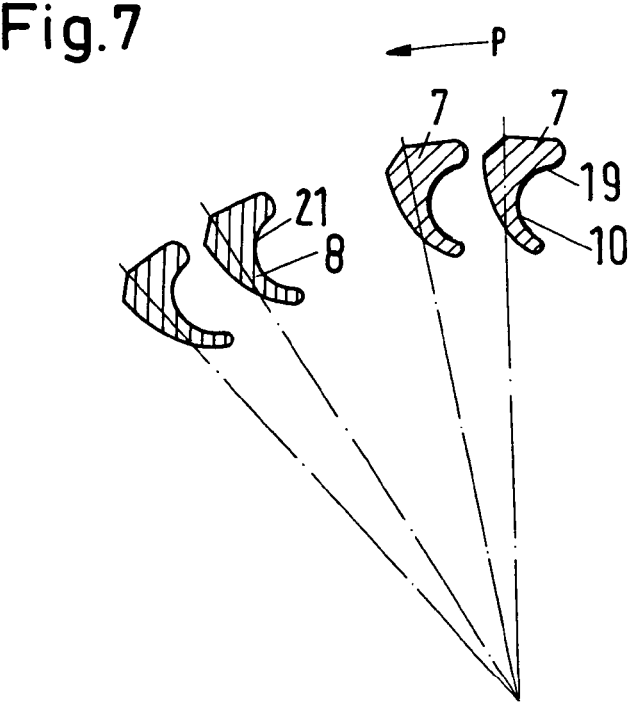

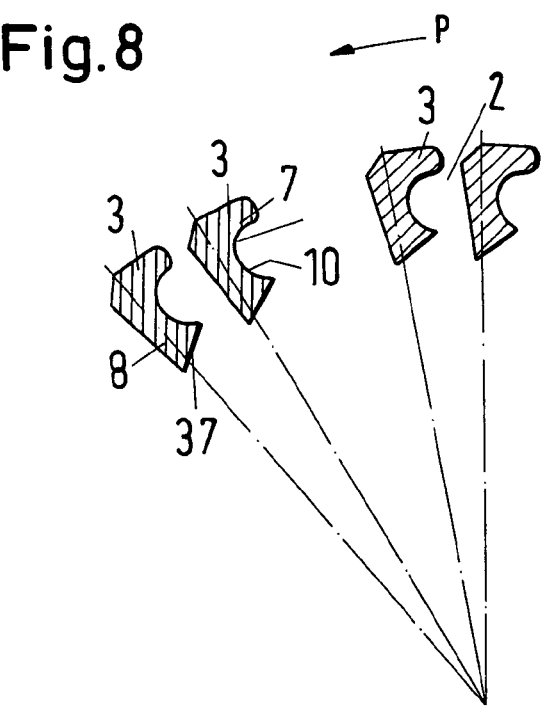
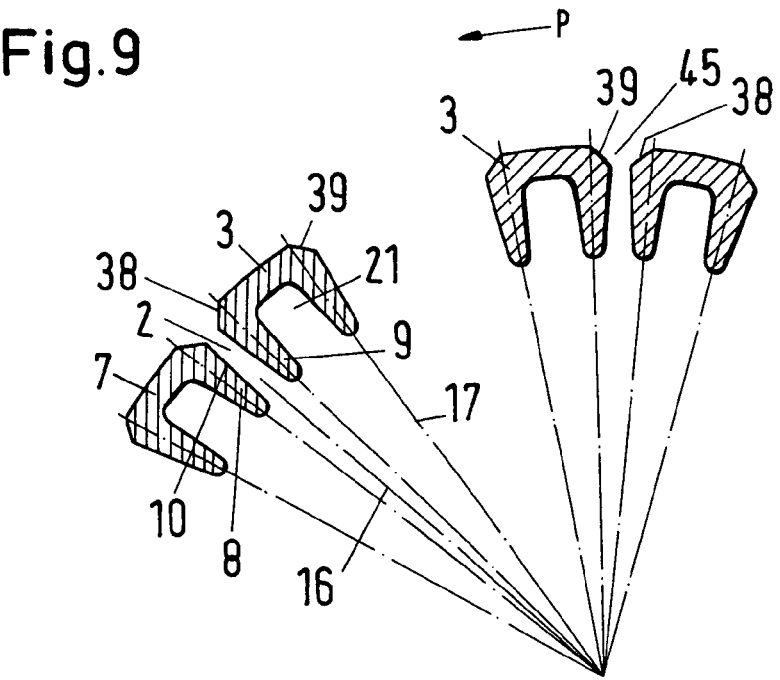

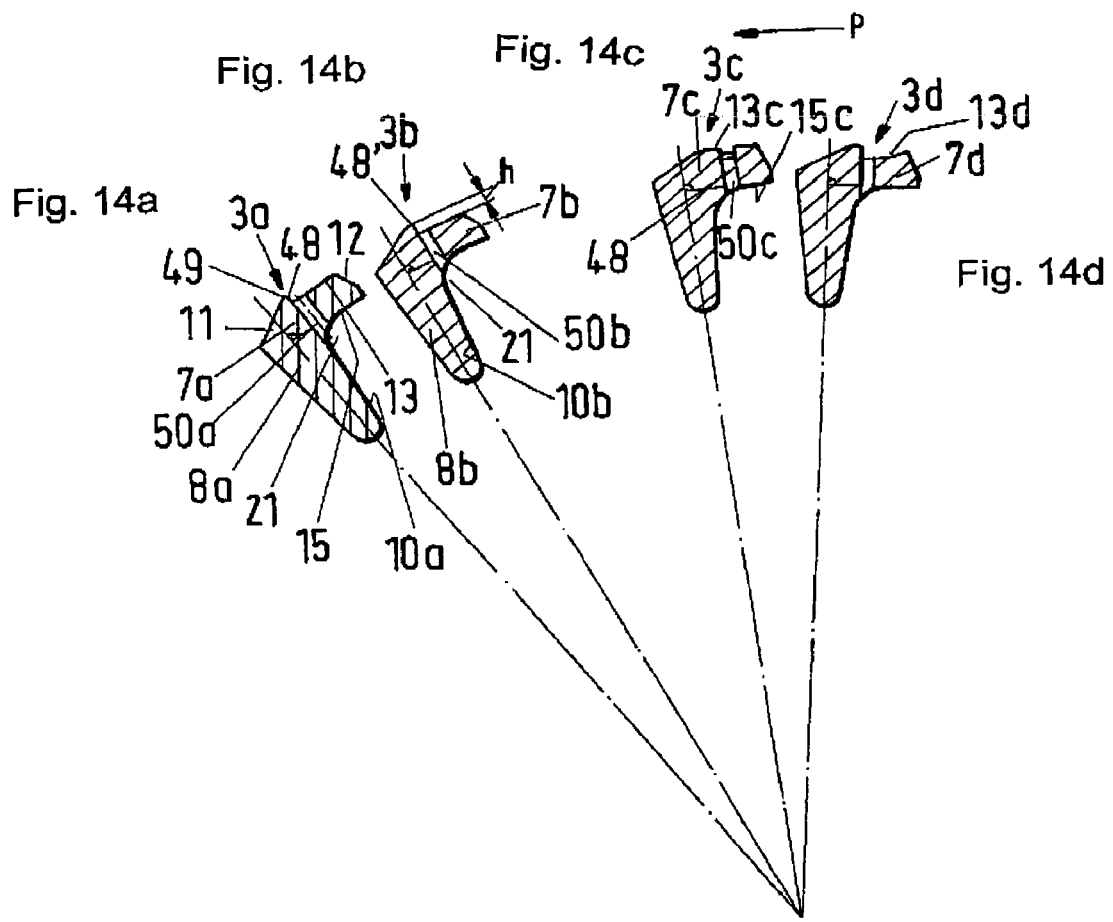
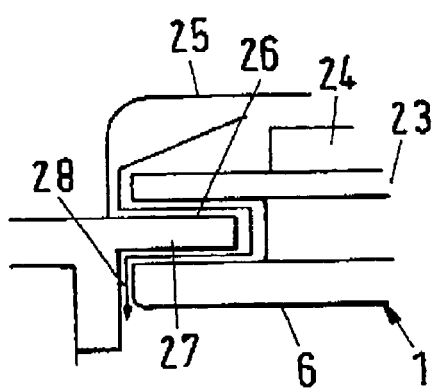
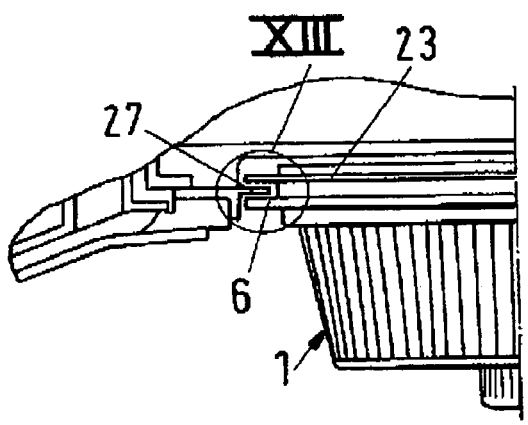

SEPARATOR

BACKGROUND OF INVENTION

The invention relates to a separator for a wet vacuum cleaner, comprising a bottom and a sidewall provided with slots delimited by lamellas, wherein through the slots an air/gas flow enters that contains dirt/dust particles and/or water droplets.

Traps or separators having a plurality of slots are known. The slots are delimited by neighboring stay-shaped lamellas having a wedge-shaped cross-section widening radially outwardly. In such separators, an air channel results in which the incoming air is guided along both sides of the lamellas so that it reaches a very high speed. In this way, the sucked-in dust particles and water droplets reach the interior of the separator where the dust particles and water droplets are partially mixed with one another. The moist dust and dirt particles deposit on the way from the separator to the exit of the device in the interior of the device. This inevitably leads to germ infestation of the interior of the device.

SUMMARY OF INVENTION

It is an object of the invention to configure a separator of this kind such that the penetration of dust particles is prevented and possibly entering dust particles are reliably deposited within the separator and entrained water droplets will evaporate upon entering the separator.

This object is solved according to the invention for a separator of the aforementioned kind in that the lamellas have at least one radial outer widened section extending in the rotational direction of the separator and delimiting together with the remaining lamella sections a turbulence chamber.

As a result of the configuration according to the invention, the dust particles are prevented from penetrating into the separator already at the widened section of the lamellas. Dust particles that possibly still penetrate into the separator are swirled in the area behind the widened section of the lamellas by a forced turbulence so that a higher vacuum results and the water droplets that also penetrate will evaporate. The dust particles present within the turbulent zone are deposited on the inner lamella walls. The widened configuration of the lamellas has also the advantage that, in this way, they have a higher stability and longer service life. Finally, by means of the widened section it is also achieved that the gap between the lamellas can be relatively wide and, in this way, can be easily cleaned. The separation of dirt, dust and liquid particles is realized in four stages by means of the separator according to the invention: In a first separation zone dirt/dust and liquid particles entrained in the air impact on the outer widened section of the lamellas and are thrown back into the container chamber. In the second separation zone, dirt/dust particles still entrained in the air are deposited in the widened space provided between the lamella stays. In a third separation zone, the liquid droplets/aerosols entering the turbulent zone are evaporated by means of the vacuum present within the turbulent zone so that the turbulent zone remains thus absolutely dry. Finally, in a fourth separation zone, the dirt and dust particles are thrown back into the container space by vacuum generation at the axially widened section of the lamellas through openings. If there are still a few particles that reach the interior of the separator, they will exit together with the gas flow from the device.

BRIEF DESCRIPTION OF DRAWINGS

FIG. 4 shows a first embodiment of lamellas of a separator according to the invention.

FIG. 5 shows a second embodiment of lamellas of a separator according to the invention.

FIG. 6 shows a third embodiment of lamellas of a separator according to the invention.

FIG. 7 shows a fourth embodiment of lamellas of a separator according to the invention.

FIG. 8 shows a fifth embodiment of lamellas of a separator according to the invention.

FIG. 9 shows a sixth embodiment of lamellas of a separator according to the invention.

FIG. 12 shows one half of a separator with a spider in a mounted position.

FIG. 13 shows the detail XIII of FIG. 12 on an enlarged scale.

FIG. 14a shows a ninth embodiment of lamellas of the separator according to the invention in cross-section.

FIG. 14b shows a tenth embodiment of lamellas of the separator according to the invention in cross-section.

FIG. 14c shows a eleventh embodiment of lamellas of the separator according to the invention in cross-section.

FIG. 14d shows a twelfth embodiment of lamellas of the separator according to the invention in cross-section.

DETAILED DESCRIPTION

Figure 2:
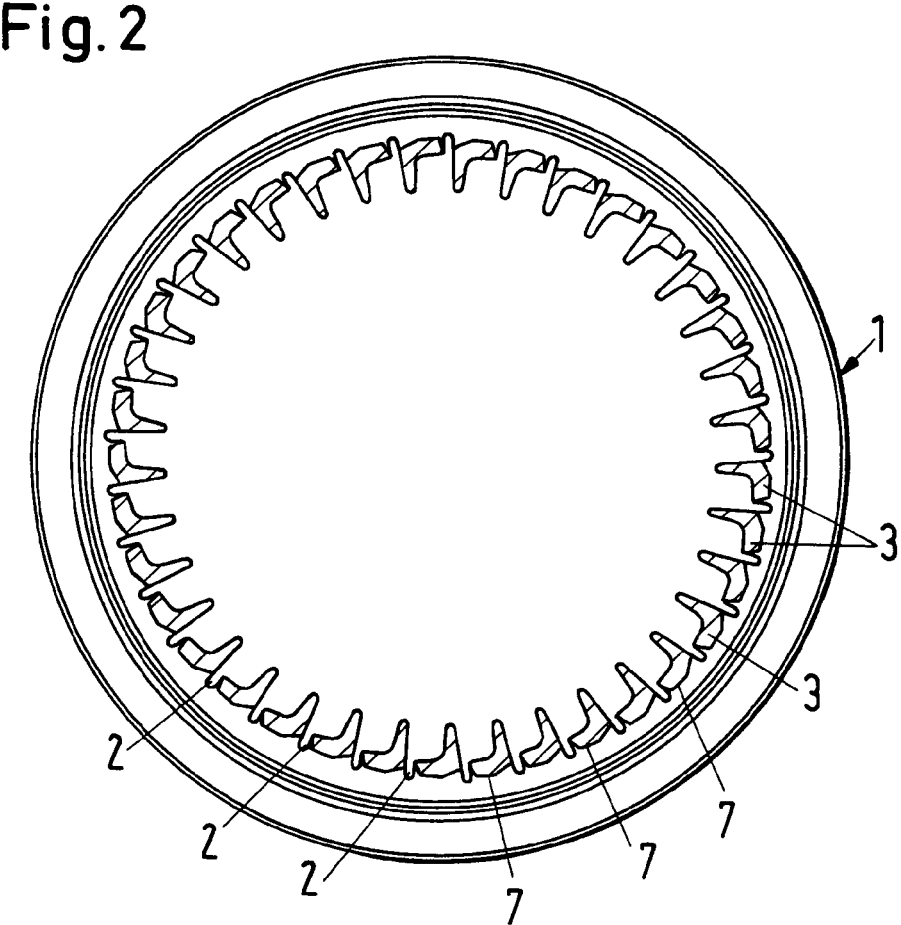
FIG. 2 is a section along the line II—II in FIG. 1.
Figure 1:
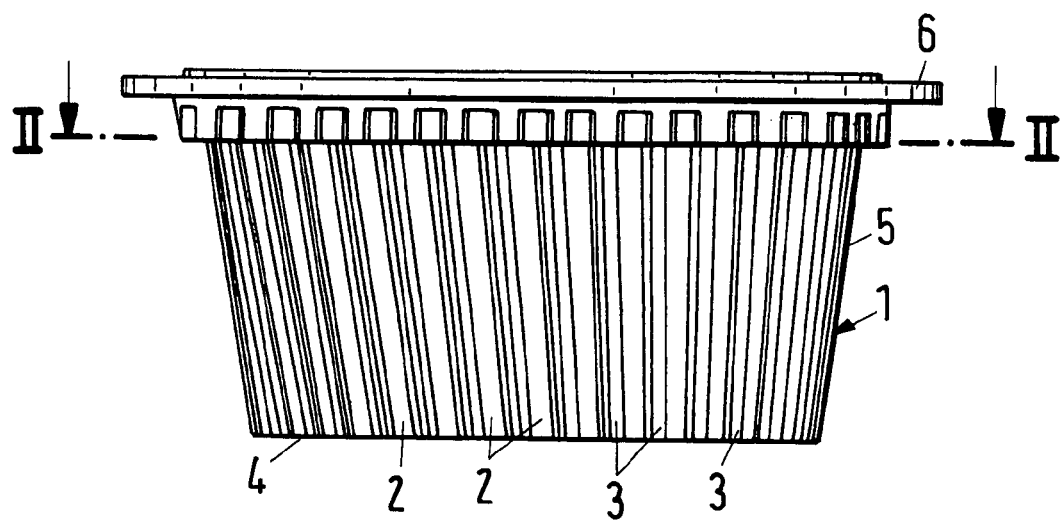
FIG. 1 shows in a side view and in a schematic illustration a separator according to the invention for a wet vacuum cleaner.

The separator illustrated in FIGS. 1 and 2 is designed for a wet vacuum cleaner (not illustrated) having a tub-shaped bottom housing part for receiving liquid, preferably water. On the bottom housing part, a top housing part 25 (FIGS. 12, 13) is positioned in which a motor with a motor shaft is arranged having at its free lower end a separator 1 fixedly attached thereto. The separator 1 rotating at high rotational speed generates a suction effect. It has axial slots 2 distributed about its circumference that are separated from one another by lamellas or stays 3. The bottom part of the housing has a connecting socket for a vacuum hose via which air is sucked in from the surroundings and guided through the liquid bath in the bottom part of the housing. The air laden with dust and dirt particles flows through the liquid bath where a large portion of the pollutants is retained. Dirt particles that are still present in the air leaving the bath are entrained toward the separator 1 where they can penetrate through the slots 2 into the separator 1. Here, they are deposited on the stay walls within a turbulent zone still to be described. Also entrained water droplets are evaporated by the vacuum that is present. The dirt particles, however, can also be returned through openings 50 provided within the lamellas 3 between a turbulence chamber 21 and a radial outer longitudinal side 11 through 13, as will be explained in connection with FIG. 14, into the tub-shaped bottom part of the housing. Moreover, the dirt particles can also be thrown off by the lamellas 3 delimiting the slots 2, as will be explained in the following.

As is also illustrated in FIGS. 1 and 2, the separator 1 has a truncated cone shape with a plane bottom 4 and a conical jacket 5 adjoining the bottom and widening in the upward direction; the jacket is provided with the slots 2. The upper rim 6 of the conical jacket 5 projects radially outwardly. In FIGS. 1 and 2, the slots 2 are distributed uniformly about the circumference of the separator and extend from the bottom 4 to the rim 6. Of course, there can be fewer slots, for example, also fewer than only four slots. The slots are then relatively wide. In this case, an optimal cleaning effect of the sucked-in air is obtained. Also, only a correspondingly minimal surface is available on which the dirt and dust particles can be deposited during operation. With such a minimal slot number, there is also a self-cleaning action which leads to the effect that possibly present deposits on the lamellas or stays 3 are at least partially removed again. Also, the separator 1 can then be cleaned easily from the interior in that a cleaning brush can be moved into the intermediate space between the lamellas or stays.

The separator 1 rotates preferably at high rotational speeds within the range of approximately 5000 rpm up to 20,000 rpm. The sucked-in air enters the interior of the separator 1 more easily through the slots 2 in the area near the bottom than the area remote from the bottom. Within the separator the air flows into the turbulent zone between the lamella stays 3. The dust particles that are entrained are then deposited, while liquid particles are evaporated and moved, together with the air, in gaseous form axially upwardly within the separator and exit together with the airflow from the device.

Figure 3:
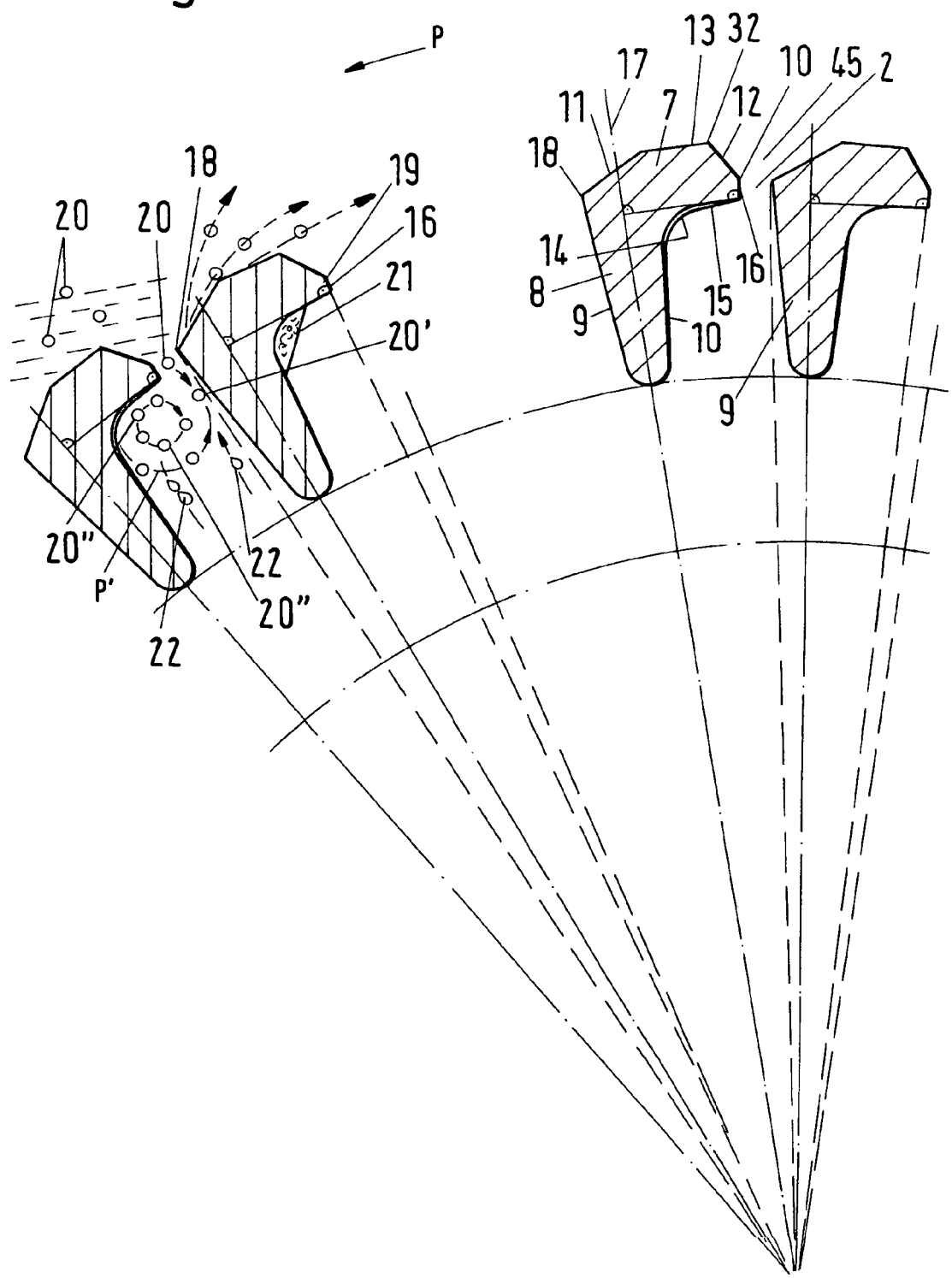
FIG. 3 shows on an enlarged scale several lamellas of the separator according to FIGS. 1 and 2 in cross-section.

As illustrated in FIGS. 2 and 3, the lamellas 3 extending across the height of the separator 1 have a substantially L-shaped cross-section with a radial outer widened section and a remaining section extending radially inwardly. The radial outer widened sections in the form of transverse stays 7 extend in the circumferential direction of the separator 1 while the radially inwardly extending remaining sections are in the form of longitudinal stays 8. The cross-section of the longitudinal stays 8 decreases radially inwardly. Radially inwardly, the sidewalls 9 and 10 of the longitudinal stays 8 have a curved transition into one another. The lamellas 3 preferably have an identical configuration.

The transverse stays 7 of the lamellas 3 extend counter to the direction of rotation P of the separator to the rear. The transverse stays have at their radial outer longitudinal side a leading beveled surface 11 and a trailing beveled surface 12. The leading longitudinal surface 11 adjoins at a small obtuse angle the sidewall 9 of the longitudinal stay 8. The surface 11 passes at a larger obtuse angle into a central section 13 that, in turn, passes at a smaller obtuse angle into the trailing surface 12. The sections 11 through 13 extend across the length of the lamella 3. The two outer sections or surfaces 11, 12 have oppositely oriented slants central section 13 is positioned tangentially to an imaginary circle about the axis of rotation of the separator 1. Moreover, the central section 13 extends approximately parallel to an inner side 15 of the transverse stay 7. It adjoins at a right angle the short, approximately radially extending end face section 16 having a transition at a small obtuse angle into the section 12. The end face section 16 is positioned at a spacing adjacent to the sidewall 9 of the neighboring lamella 3.

The inner side 15 of the transverse stay 7 passes with a circular section-like curved transition section 14, which can also be angular, into the sidewall 10 of the longitudinal stay 8.

FIG. 3 also shows that the inner side 15 extends approximately perpendicularly to the longitudinal center plane 17 of the longitudinal stay 8 which intersects the leading surface 11 of the transverse stay 7 approximately at half the width. The leading edge 18 between the sidewall 9 and the surface 11 is positioned approximately at the same level as the edge 19 formed between the end face section 16 and the surface 12.

With the relatively wide configuration of the outer wall sections 11 and 12, dust particles 20 (FIG. 3) are already wetted before entering the separator or trap 1 by means of liquid which splashes upwardly from the liquid container as a result of the sucked-in airflow. In this way, the volume and the mass of the dust particles 20 increase so that flowing into the separator 1 is made more difficult. The dirt particles 20 are therefore flushed off the surfaces or sections 11, 12, and 13, as illustrated, and they fall back into the liquid container and are retained therein within the liquid.

The outer wall sections 11 and 12 of neighboring lamellas 3 delimit inlet sections 45 extending across the height of the separator 1 and tapering radially inwardly; the inlet sections 45 open into the slots 2, and sucked-in air can flow through them into the separator 1. As a result of the relatively wide configuration of the transverse stays 7 of the lamellas 3, the slots 2 present in the jacket 5 of the separator 1 are relatively small so that the separator has a substantially closed configuration. The number of slots 2 can be reduced to fewer than five. In this case, still less dust can penetrate into the separator 1. The dirt particles 20' and/or finest water droplets 22 impact mainly on the outer wall sections 11 where they are thrown off. By means of this primary separation, the greatest proportion of the dirt/dust particles 20' are retained.

Dust/dirt particles 20' that possibly still reach via the slots 2 the separator 1 flow into the turbulence chamber 21 delimited by the inner side 15, the curved transition section 14, and a part of the sidewall 10 of the longitudinal stay 8. In the turbulence chamber 21, the dust/dirt particles 20' are swirled. As a result of the swirling effect, these particles leave the airflow and are deposited in collecting pockets of the stays in the area of the inner side 15 or its radius. At the same time, the water droplets penetrating through the narrow slots 2 are exposed in the area of the turbulence chamber 21 to such a strong vacuum that they evaporate. The turbulence chambers 21 form a secondary and tertiary separation stage.

As a result of the described configuration of the lamellas 3 with the transverse stays 7, the longitudinal stays 8 have a relatively large spacing from one another; the user of the wet vacuum cleaner can easily penetrate them with a cleaning brush in order to remove the dirt/dust particles deposited in the turbulence chambers 21.

The L-shaped cross-sectional configuration of the lamellas 3 results in a high stability of the lamellas. Also, in the circumferential and radial direction of the separator 1 a high stability is obtained in this way so that the separator can be manufactured substantially larger than those known in the prior art.

The L-shaped cross-sectional configuration of the lamellas 3 has also the advantage that within the separator 1 the differential pressure can be controlled. In this way, a partial self-flushing effect between the rim 6 of the separator 1 and a rim 23 of a spider 24 of the top part 25 of the housing of the wet vacuum cleaner that is positioned at a spacing thereto can be ensured (compare FIGS. 12 and 13). An edge 27 of the housing 28 of the wet cleaning device projects into the gap 26 between the rims 6 and 23, as illustrated in FIGS. 12 and 13. Through the labyrinth-like gap 26 an airflow 28 flows from the interior of the separator 1 to the exterior. In this way, it is prevented that fibers and/or dust/dirt particles penetrating into the gap 26 can reach the interior so that plugging of the gap 26 is prevented reliably.

FIG. 4 shows a further embodiment of lamellas 3 that differ from the embodiment described above by the different configuration of the transverse stay 7. The transverse stay 7 has an outer side 29 curved at a large radius of curvature about the axis 30 of the separator 1. The two end faces 31, 32 of the transverse stay 7 adjoin at a right angle the outer sides 29. The leading end face 31 in the direction of rotation P is aligned with the sidewall 9 of the longitudinal stay 8. The trailing end face 32 passes at a right angle into the inner side 15 of the transverse stay. In this embodiment, the afore described advantages are also present because the dust particles are wetted on the relatively long transverse stay 7 by the liquid or water and flushed away already outside of the separator 1. Dirt/dust particles 20 that may still enter via the slots 2 into the separator 1 are then swirled in the turbulence chamber 22 that is delimited by the inner side 15 and the sidewall 10 of the longitudinal stay 8, the liquid is evaporated, and the dust particles are deposited within the turbulence chamber on the side surfaces.

In the embodiment according to FIG. 5, in contrast the above described configuration, only the transverse stay 7 is somewhat longer and projects in the circumferential direction slightly past the sidewall 9. The planar end face 31 of the thus formed projection 33 passes along the inner side via a shoulder surface 34 with a rounded portion into the sidewall 9 of the longitudinal stay 8. The shoulder surface 34 is aligned substantially with the inner side 15 of the transverse stay 7. In this embodiment of the lamellas 3, the dirt/dust particles are flushed off on the relatively long transverse stay 7 before entering the separator 1 and are thus prevented from entering. Possibly still penetrating dirt/dust particles are deposited by the turbulence within the turbulence chamber 21 on the side surfaces. Because of the relatively large spacing of the neighboring longitudinal stays 8, their intermediate space can be cleaned particularly easily. The relatively narrow slots 2 ensure in connection with the wide transverse stays 7 an extremely closed configuration of the separator 1.

FIG. 6 shows lamellas 3 that correspond substantially to those of FIG. 4. The transverse stays 7 have a beveled surface 11 leading in the direction of rotation P and connecting the longitudinal side 9 of the longitudinal stay 8 with the central outer side section 13 of the transverse stay 7. The other end face 32 of the transverse stay 7 is rounded in a semi-circular shape. The radial inner end 36 of the longitudinal stay 8 is bent slightly to the rear counter to the direction of rotation P so that the trailing side wall 10 is concavely curved. The leading sidewall 9 in the direction of rotation P of the longitudinal stay 8 is planar and has a transition in the radial inner area via a beveled surface 43 into a rounded end face 44 of the longitudinal stay. The beveled surface 43 is beveled counter to the direction of rotation P to the rear and is narrower than the beveled outer surface 11 of the transverse stay 7. By means of the long transverse stay 7 with beveled surface 11 and the radial turbulence chamber 21 located radially inwardly between the transverse stay 7 and the longitudinal stay 8, the penetration of dirt/dust particles is substantially prevented and the still penetrating dust particles are simply and quickly removed. The inlet area 45 between the end face 32 of the transverse stay 7 and the beveled surface 11 of neighboring lamellas 3 widens from the slot 2 radially outwardly so that evaporation of the liquid and deposition of dirt/dust particles in the turbulence chamber 21 is accelerated even better.

The same holds true for the embodiment according to FIG. 7. In this configuration, the transverse stay 7 is substantially identical to the lamellas according to FIG. 6. The longitudinal stay 8 of the lamellas 3 according to FIG. 7 is however even more strongly curved and tapers radially inwardly more strongly than in the longitudinal stay 8 according to FIG. 6. In this way, the turbulence chamber 21 between the inner side 15 of the transverse stay 7 and the sidewall 10 of the longitudinal stay 8 is enlarged even more so that a still stronger turbulence effect is obtained.

The configuration according to FIG. 8 corresponds to that of FIG. 6 with the difference that the longitudinal stay 8 of the lamellas 3 is somewhat shorter and has in the direction of rotation P an end 37 that extends at a slant outwardly. The sidewall 10 of the longitudinal stay 8 extends with such a curvature that the width of the longitudinal stay 8 measured in the direction of rotation P, starting at the transverse stay 7, first decreases and increases again approximately at half the radial length. Otherwise, the lamellas 3 are identical to the configuration of FIG. 6. The transverse stay 7 and the longitudinal stay 8 delimit radially inwardly the turbulence chamber 21 in which dirt/dust particles possibly still penetrating into the separator are swirled by the air and then deposited on the side surfaces of the turbulence chamber 21.

The lamellas 3 according to FIG. 9 have a U-shaped cross-section. Their shape corresponds substantially to two mirror-symmetrically positioned lamellas 3 according to FIG. 4 having leading and trailing end faces 38 and 39 in the direction of rotation P that are beveled like the sections 11 of lamellas 3 according to FIG. 6. Their longitudinal stays 8 taper conically radially inwardly. They are connected by means of a common transverse stay 7 to one another. In this embodiment, the dirt/dust particles are also thrown off or washed off from the relatively wide transverse stays 7 with the beveled end faces 38, 39 before penetrating into the separator 1. Dirt/dust particles that still penetrate through the slots 2 are swirled in the turbulence chambers 21, dried, and deposited on the side surfaces of the turbulence chamber. In contrast to the preceding embodiments, the slots 2 extend across a radial length of the longitudinal stays 8. Since the sidewalls 9,10 delimiting the slots 2 of the neighboring lamellas 3 diverge radially inwardly, the slot width increases radially inwardly. The plane beveled surfaces 38, 39 of neighboring lamellas 3 delimit the inlet areas 45 leading into the slots 2 which taper radially inwardly. The longitudinal plane 46, 47 of the slots 2 and the longitudinal stays 8 form radial planes of the separator 1.

Figure 10:
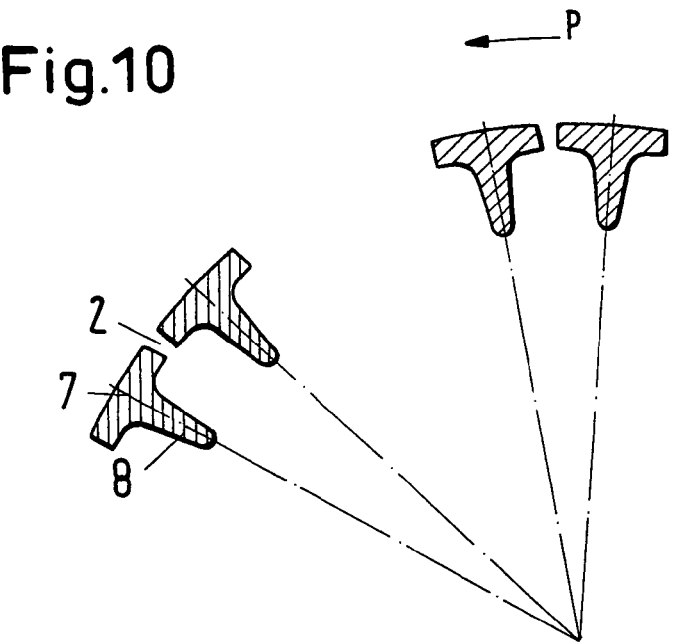
FIG. 10 shows a seventh embodiment of lamellas of a separator according to the invention.

The lamellas 3 according to FIG. 10 have a substantially T-shaped cross-section so that they differ from the lamellas according to FIG. 4 only in that their transverse stays 7 project in the direction of rotation P past both sidewalls 9, 10 of the longitudinal spays 8. Otherwise, this embodiment corresponds to that of FIG. 4.

Figure 11:
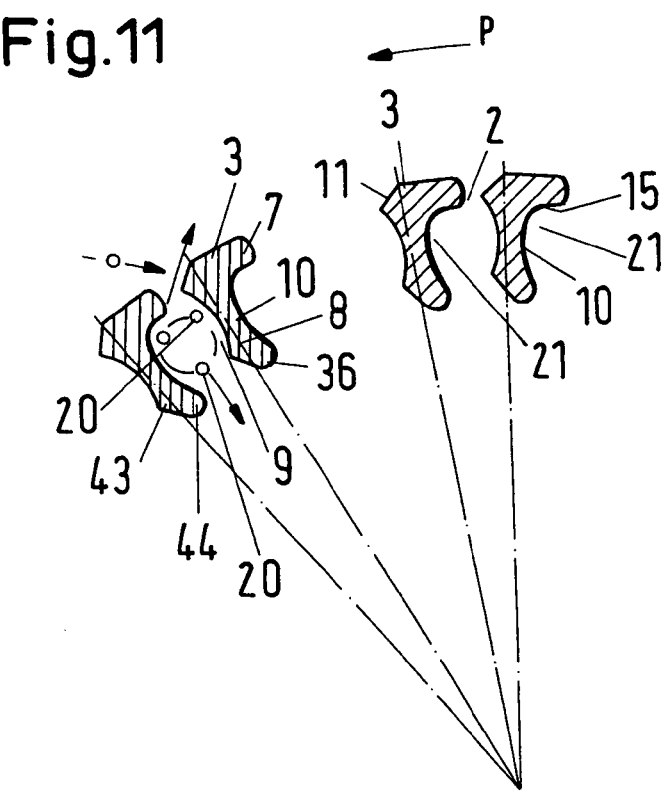
FIG. 11 shows an eight embodiment of lamellas of a separator according to the invention.

The lamellas 3 according to FIG. 11 are substantially identical to those of FIG. 6. They differ in that the sidewalls 9 of the longitudinal stays 8 are also concavely rounded like a circular section. The sidewalls 9 have a transition at the radial outer end at a right angle into the surface 11 of the transverse stay 7. The free end 36 of the longitudinal stays 8 is provided, as in the lamellas according to FIG. 6, with the beveled surface 43 and the rounded end face 44. In the turbulence chamber 21 between the inner side 15 of the transverse stay 7 and the sidewall 10 of the longitudinal stay 8, the particles 20 that are swirled therein are accelerated and transported against the oppositely positioned sidewall 9 and accelerated again at this concave surface. In this way, an even higher vacuum in the flow zone is achieved so that the introduced liquid is reliably evaporated.

FIGS. 14*a*–14*d* show differently designed lamellas 3*a* to 3*d* having at least one opening 50*a*–50*d* connecting the interior of the separator 1 with the exterior side, respectively. The opening 50*a* to 50*d* opens into the turbulence chamber 21, respectively. The exterior side of the lamellas 3*a* to 3*d* has at least one vacuum area. The vacuum area is delimited in the direction of rotation P of the separator 1 by a step 48, 48' of the lamellas 3*a* to 3*d* provided on the exterior side. The vacuum area is delimited in this way in a forward or leading direction relative to the direction of rotation. The vacuum area, relative to the direction of rotation P of the separator 1, is rearwardly open.

While specific embodiments of the invention have been shown and described in detail to illustrate the inventive principles, it will be understood that the invention may be embodied otherwise without departing from such principles.

What is claimed is:

1. A separator for a wet vacuum cleaner, the separator comprising:

a bottom;

a sidewall connected to the bottom and comprised of lamellas delimiting slots, wherein through the slots an air/gas flow enters an interior of the separator, delimited by the bottom and the sidewall, wherein the air/gas flow contains dirt/dust particles and/or water droplets;

wherein the lamellas each have at least one radial outer widened section, extending in a rotational direction of the separator, and at least one remaining lamella section, wherein the at least one radial outer widened section and the at least one remaining lamella section delimit together a turbulence chamber, respectively.

2. The separator according to claim 1, wherein the lamellas have approximately an L-shaped cross-section.

3. The separator according to claim 1, wherein the lamellas have approximately a T-shaped cross-section.

4. The separator according to claim 1, wherein the lamellas have approximately a U-shaped cross-section.

5. The separator according to claim 1, wherein the at least one radial outer widened section is a transverse stay oriented relative to the at least one remaining lamella section in the rotational direction, or counter to the rotational direction, or in the rotation direction and counter to the rotational direction.

6. The separator according to claim 1, wherein the at least one radial outer widened section has a projection extending in the rotational direction past the at least one remaining lamella section.

7. The separator according to claim 6, wherein the projection has only a minimal extension.

8. The separator according to claim 7, wherein a leading surface of the at least one radial outer widened section leading in the rotational direction is formed by a sidewall of the at least one remaining lamella section.

9. The separator according to claim 8, wherein a trailing surface of the at least one radial outer widened section extends approximately perpendicularly to a radial outer side of the at least one radial outer widened section.

10. The separator according to claim 9, wherein the radial outer side is curved at a great radius of curvature of a circular section.

11. The separator according to claim 9, wherein at least the leading surface of the at least one radial outer widened section in the rotational direction is beveled, or rounded, or beveled and rounded.

12. The separator according to claim 9, wherein the leading and trailing surfaces of the at least one radial outer widened section are beveled, or rounded, or beveled and rounded.

13. The separator according to claim 9, wherein the leading and trailing surfaces of the at least one radial outer widened section have approximately a same width in the rotational direction.

14. The separator according to claim 9, wherein the leading and trailing surfaces are connected to one another by a central surface section of the at least one radial outer widened section, wherein the trailing surface extends at a steeper angle relative to the central surface section than the leading surface.

15. The separator according to claim 14, wherein the trailing surface has a transition via a narrow end face section into a radially inwardly positioned inner side of the at least one radial outer widened section.

16. The separator according to claim 15, wherein the end face section adjoins substantially perpendicularly the inner side.

17. The separator according to claim 15, wherein the inner side extends approximately parallel to the central surface section.

18. The separator according to claim 1, wherein the at least one remaining lamella section is a substantially radially extending longitudinal stay.

19. The separator according to claim 18, wherein the longitudinal stay, beginning at the at least one radial outer widened section, extends substantially radially inwardly.

20. The separator according to claim 18, wherein the longitudinal stay has a leading side surface and a trailing side surface in the rotational direction, wherein the leading and trailing side surfaces extend in a V-shape relative to one another.

21. The separator according to claim 20, wherein at least one of the trailing side surface and the leading side surface is curved to have a circular section shape.

22. The separator according to claim 20, wherein the leading side surface is curved at a greater radius of curvature than the trailing side surface.

23. The separator according to claim 18, wherein a radial inner end of the longitudinal stay is rounded.

24. The separator according to claim 23, wherein the radial inner end is rounded to have a circular section shape.

25. The separator according to claim 1, wherein the lamellas have at least one opening connecting the interior of the separator with an exterior side of the lamellas.

26. The separator according to claim 25, wherein on the exterior side of the lamellas at least one vacuum area is provided, respectively.

27. The separator according to claim 26, wherein the lamellas each have a step on the exterior side in the vacuum area, wherein the step delimits the vacuum area in a rotational direction of the separator in a forward direction.

28. The separator according to claim 27, wherein the vacuum area in the rotational direction of the separator is rearwardly open.

29. The separator according to 25, wherein the at least one opening opens into the turbulence chamber.

30. A separator for a wet vacuum cleaner, the separator comprising:

a bottom;

a sidewall connected to the bottom and comprised of lamellas delimiting slots, wherein through the slots an air/gas flow enters an interior of the separator, delimited by the bottom and the sidewall, wherein the air/gas flow contains dirt/dust particles and/or water droplets;

wherein the lamellas have at least one opening connecting the interior of the separator with an exterior side of the lamellas.

* * * * *